M. J. SASGEN.
DUMPING WAGON AND THE LIKE.
APPLICATION FILED APR. 10, 1919.
1,322,958.
Patented Nov. 25, 1919.
3 SHEETS—SHEET 1.
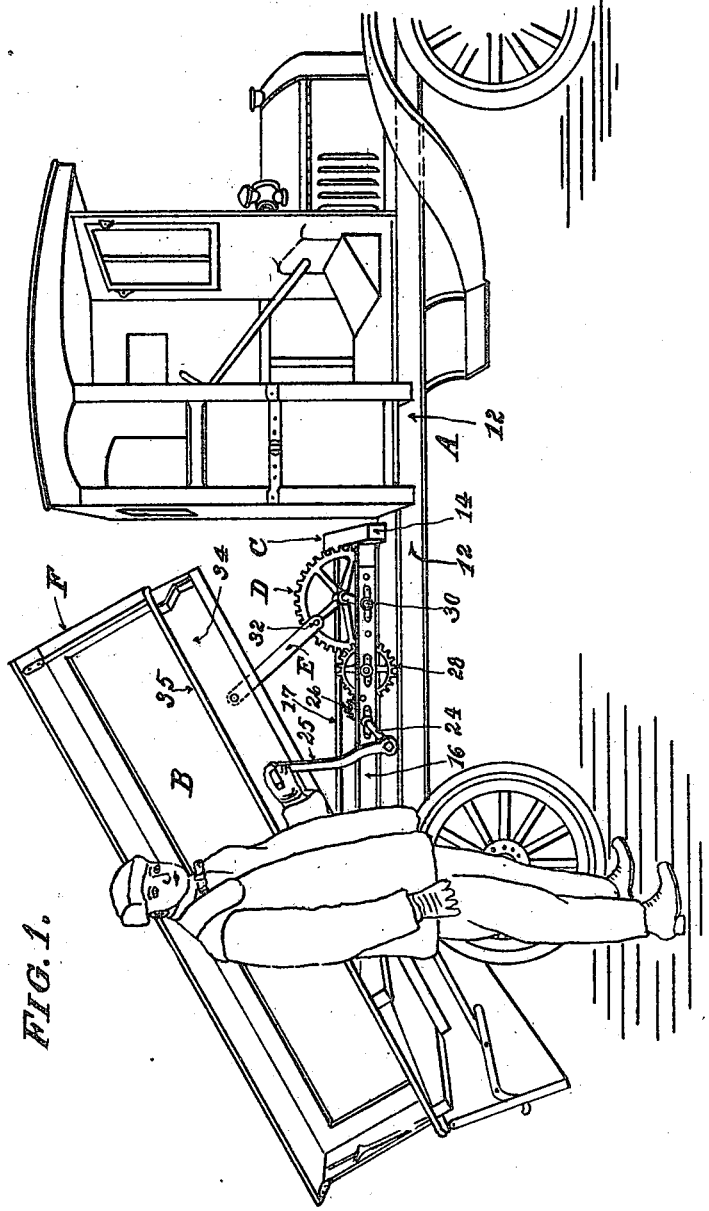
WITNESS:
Al. Stark.
INVENTOR:
MICHAEL J. SASGEN,
BY
Michael J Stark & Sons
ATTORNEYS.

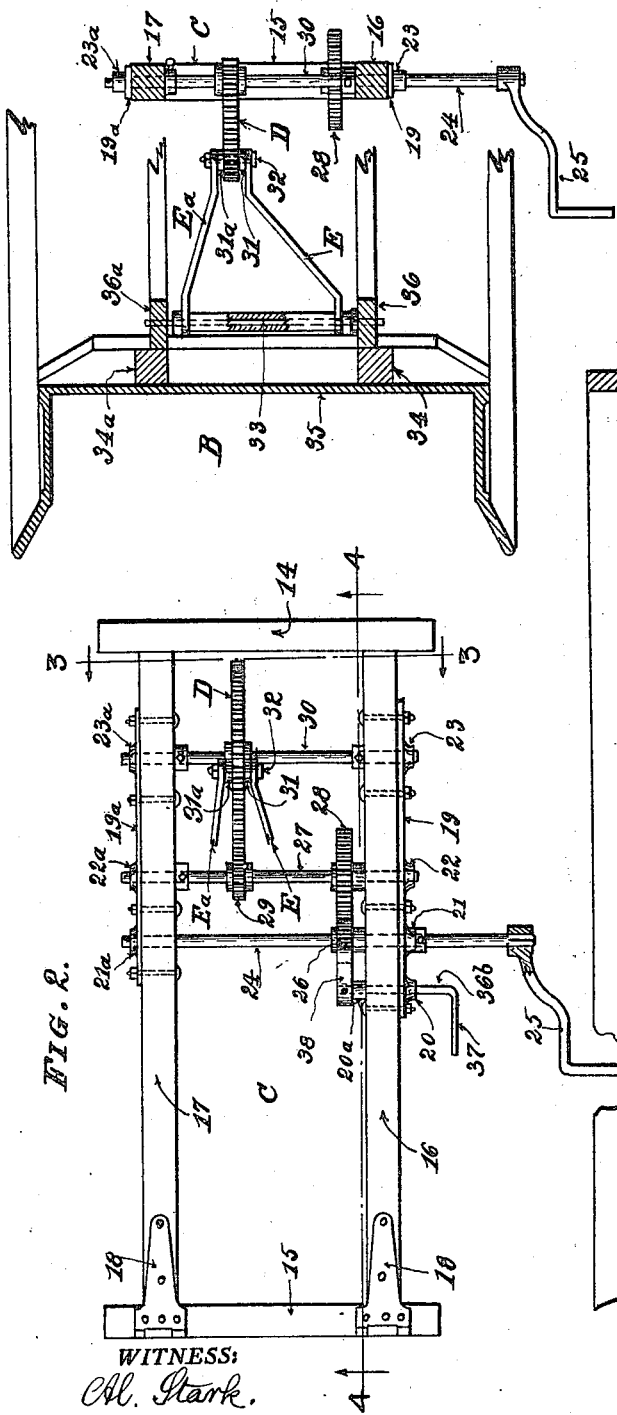

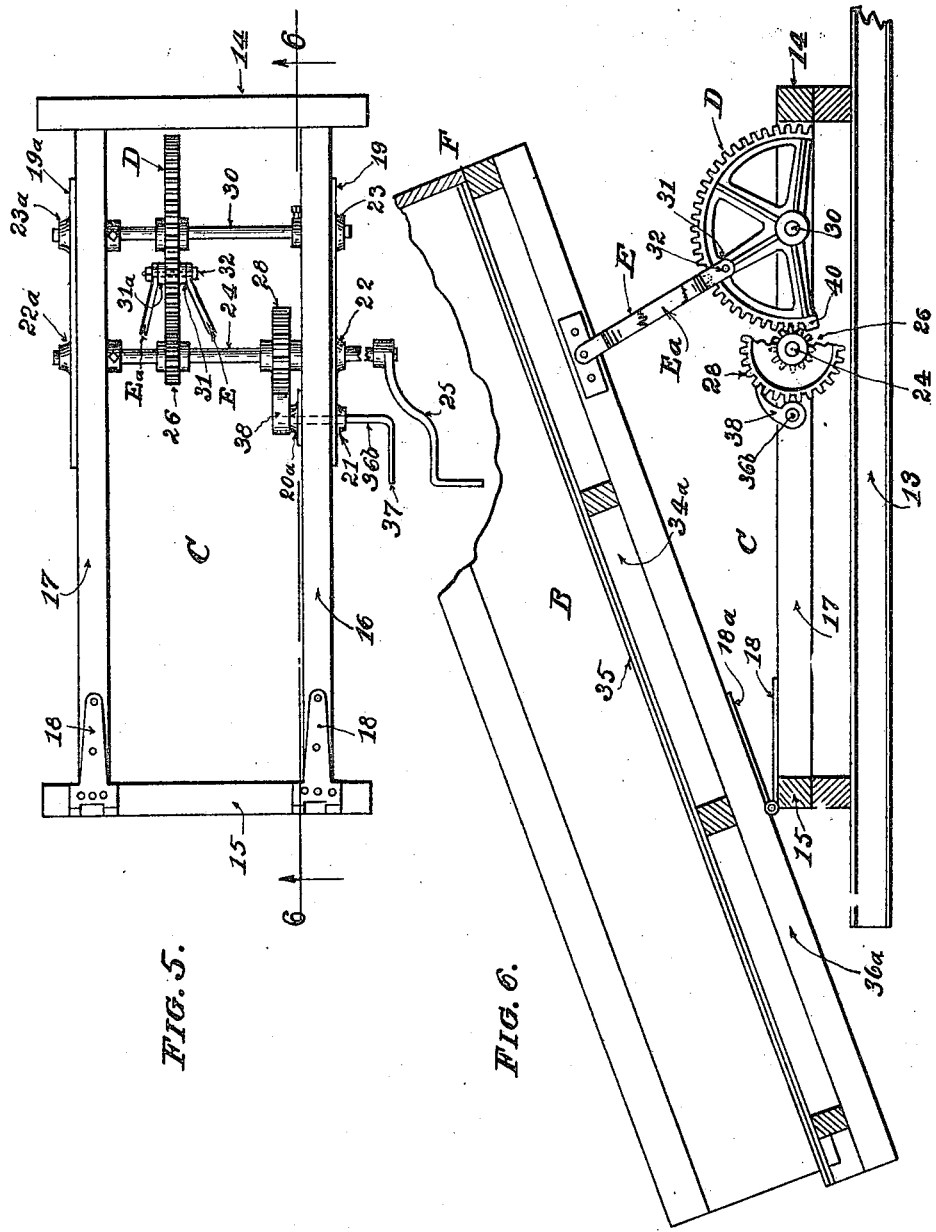

UNITED STATES PATENT OFFICE.

MICHAEL J. SASGEN, OF CHICAGO, ILLINOIS.

DUMPING-WAGON AND THE LIKE.

1,322,958.

Specification of Letters Patent.  Patented Nov. 25, 1919.

Application filed April 10, 1919. Serial No. 288,961.

*To all whom it may concern:*

Be it known that I, MICHAEL J. SASGEN, a citizen of the United States, and a resident of the city of Chicago, in the county of Cook and State of Illinois, have invented a certain new and useful Improvement in Dumping-Wagons and the like; and I do hereby declare that the following description of my said invention, taken in connection with the accompanying sheets of drawings, forms a full, clear, and exact specification, which will enable others skilled in the art to which it appertains to make and use the same.

My invention relates generally to improvements in dumping wagons and the like; and it consists, essentially, in the novel and peculiar combination of parts and details of construction, as hereinafter first fully set forth and described and then pointed out in the claims.

The object of this invention is the production of an efficient and serviceable mechanism for tilting the boxes of dumping wagons; and it is especially designed for use in motor trucks and the like vehicles. To accomplish this object, and others which will hereinafter appear, I construct this mechanism as shown in the drawings forming a part of this specification, and illustrating the preferred embodiment of my invention. In these drawings—

Figure 1 is a perspective view of a motor truck constructed in accordance with my invention, the wagon box being shown in tilted position. Fig. 2 is a plan view of the mechanism by which the wagon box, not shown in this figure, is operated. Fig. 3 is a sectional end elevation on line 3—3 of Fig. 2, of a modified form of construction of this device. Fig. 4 is a longitudinal sectional elevation on line 4—4 of Fig. 2. Fig. 5 is a plan view similar to Fig. 2, and showing a slight modification of my invention. Fig. 6 is a longitudinal sectional view on line 6—6 of Fig. 5, and also illustrating this modified form of construction, the wagon box being shown in tilted position.

Like parts are indicated by the same characters and symbols of reference in all the figures.

A, in the drawings indicates the truck as a whole. It may be of any desired construction, and comprises the usual chassis including the sills or channels 12, 13, which extend to the rear of the truck. Upon these sills there is secured a, preferably wooden, frame structure C, comprising two transverse members 14, 15, and two longitudinal beams 16, 17. At the rear end, this frame structure has a multiplicity of hinges 18, preferably of the strap-hinge type, one member of which is secured to said frame structure, and the other member of which is secured to the wagon box B, as will hereinafter appear.

At the outer sides of the longitudinal beams 16, 17, there are secured metallic plates 19, 19$^a$, which have outwardly extending, tubular bosses 20, 21, 21$^a$, 22, 22$^a$, and 23, 23$^a$, which afford bearings for a series of shafts. Thus, in bearings 21, 21$^a$, there is rotatably mounted a shaft 24, which has at one end a crank 25, and between the frame-members 16, 17, a gear pinion 26. In the bearings 22, 22$^a$, there is rotatably mounted a shaft 27, upon which there is secured a spur gear wheel 28, meshing with the gear pinion 26, and also a gear pinion 29. In the bearings 23, 23$^a$, there is mounted a rocking shaft 30, upon which there is secured a segment of a spur gear wheel D, which meshes with the gear pinion 29, so that by rotating the first shaft 24, by its crank 25, this gear segment D will likewise be rotated.

The segmental gear wheel has approximately medially of its rim, two sidewise-extending tubular bosses 31, 31$^a$, to which are pivotally connected at one end by a bolt 32, a pair of links E, E$^a$, the other ends of said links being pivotally connected to a rod 33, passing through a pair of longitudinal timbers 34, 34$^a$, located underneath the wagon box B either directly, as shown in Fig. 4, or to an additional pair of narrower longitudinal timbers 36, 36$^a$, secured to the timbers 34, 34$^a$, as illustrated in Figs. 3 and 6.

In the bearing 20, and a coacting bearing 20$^a$, Fig. 2, there is rotatably mounted a shaft 36$^b$, the outer end of which is cranked, as at 37, and the inner end of which carries a dog 38, engaging the first pinion 26.

Attention is now invited to the wagon box B, which is hingedly connected to the frame structure C. This hinge connection is so disposed that the preponderance of weight of the box is at the forward end F, so that, in normal position the box B is in horizontal position and rests upon the frame structure C. But when the crank 25 is rotated to rotate the segmental gear wheel D, this rotation causes the links E, E^a, to lift the forward end F of the box B, and when rotated approximately one half of a revolution, the inclination of the box is such that it exceeds the angle of repose of any material in the box, such as coal, coke, stone, gravel, sand, and the like, so that this material will be automatically discharged from the box.

The dog 38, when engaging the gear pinion 26, will hold the box at any desired inclination within the scope of the mechanism hereinbefore described.

The mechanism for tilting the box hereinbefore described is adapted for use in connection with the heaviest trucks employed for hauling such materials as hereinbefore described, but on the lighter trucks having a capacity of say one or two tons only, I can dispense with the second shaft 27 and the gear pinion 29, as illustrated in Figs. 5 and 6, and place the shaft 24 into the bearings 22, 22^a, and gear wheel 28 upon this shaft, and the gear pinion 26 thereon in such a position that it will be in mesh with the segmental gear wheel D. In this case the cranked shaft 36^b will be placed in the bearing 21, so that the dog 38 engages the spur gear wheel 28, a matter which will be readily understood by persons skilled in the art to which my invention appertains.

It is obvious that in a vehicle of the nature described, provision may be made for locking the wagon box B in horizontal position, in addition to the links E, E^a, of the elevating device, which when in the position shown in Fig. 4, will accomplish this object in an efficient manner. As shown in this Fig. 4, the links E, E^a, when the box is in horizontal position, touch the shaft 30, and thereby prevent further rotation of the segmental gear wheel; but when the box is in tilted position shown in Figs. 1 and 6, means are desirable for preventing further rotation of the said segmental gear wheel D. This I accomplish by making the end-cog 40 thereof exceptionally heavy as shown in Figs. 4 and 6, so that when this cog reaches the gear pinion 29, further rotation of the segmental gear wheel is impossible. However, other means may be constructed to accomplish the desired result without departing from the scope of my invention.

I have hereinbefore stated that this construction for tilting a wagon box is especially effective in motor driven vehicles, it is, however, evident that this construction may be used in vehicles other than motor driven trucks.

While I have hereinbefore described this invention and some modification thereof, I desire it to be understood that I am aware that further changes in the details of construction thereof may be made, and parts omitted without departing from the scope of my invention as defined in the subjoined claims.

Having thus fully described this invention, I claim—

1. Mechanism for tilting a wagon box in a dumping vehicle, including, in combination, a wagon box, a rectangular frame, said wagon box being mounted on said frame, hinges at one end of said rectangular frame and connected to said wagon box remote from the medial part thereof, a shaft rotatably mounted in said frame, an operating crank at one end of said shaft, a gear wheel on said shaft, a dog for engaging said gear wheel, a second shaft rotatably mounted in said frame, a segmental gear wheel fixed to the latter shaft, a pair of links pivoted to said segmental gear wheel at one of their ends, and approximately medially of the rim of said segmental gear wheel, the other ends of said links being pivotally connected to the wagon box, and means for connecting said first shaft to the segmental gear wheel, said segmental gear wheel being provided with a stop to prevent its rotation beyond a predetermined position.

2. In a motor driven vehicle, a tiltable wagon box, and means for tilting said box, said means including, in combination, a rectangular frame fixedly connected to said vehicle, hinges secured to one end of said frame with one of their members, and with the other of said members to said wagon box, a shaft rotatably mounted in said frame, one end of said shaft projecting from said frame, a crank at the projecting end of said shaft, a gear pinion fixed to said shaft, a second shaft rotatably mounted in said frame, a gear wheel on the latter shaft meshing with said gear pinion, a gear pinion on the second shaft, a third shaft mounted in said frame, a segment of a gear wheel fixed to said third shaft and meshing with the gear pinion on the second shaft, a pair of links pivoted to said segmental gear wheel at one of their ends and approximately medially of the rim of said segmental gear wheel, the other ends of said links being pivotally connected to the wagon box, and means for locking the gearing to prevent rotation thereof.

3. In a device of the nature described, the combination, of a wagon box, a frame upon which said wagon box is hingedly mounted, said wagon box being normally bearing upon said frame, the hinged connection being at the rear end of said frame, and slightly to the rear of the middle of said wagon box, a driven shaft rotatably mounted in said frame, a segment of a gear wheel fixed to said shaft approximately medially of said shaft, said segment of a gear wheel having medially of its rim a pivot extending from both flanks of said rim, a pair of links connected at one end to said pivot and at their other ends to said wagon box, and gearing connected with said segmental gear wheel for rotating this latter gear wheel approximately one half of a revolution so that when said wagon box is in lowered position, the rim of the segmental gear wheel will be entirely below said wagon box to permit said wagon box to reach its lowered position and to bear upon said frame.

In testimony that I claim the foregoing as my invention I have hereunto set my hand.

MICHAEL J. SASGEN.